United States Patent [19]

Kasinoff

[11] Patent Number: 4,763,739
[45] Date of Patent: Aug. 16, 1988

[54] ENERGY EFFICIENT SCALE

[75] Inventor: Harvey A. Kasinoff, Troy, Ohio

[73] Assignee: Hobart Corporation, Troy, Ohio

[21] Appl. No.: 118,379

[22] Filed: Nov. 9, 1987

[51] Int. Cl.⁴ .................. G01G 3/14; G01G 13/00; G01L 1/22
[52] U.S. Cl. .................. 177/210 R; 177/1; 177/63; 73/862.67
[58] Field of Search ............ 177/1, 63, 165, 210 R, 177/211; 73/862.67

[56] References Cited

U.S. PATENT DOCUMENTS 4,363,368 12/1982 Paddon et al. ............. 177/144
4,512,432 4/1985 Balenger ................... 177/211
4,696,359 9/1987 Glibbery ................... 177/211

OTHER PUBLICATIONS

Electro Scale Models 935 & 940 Battery Operated Counting Scales.

Primary Examiner—George H. Miller, Jr.
Attorney, Agent, or Firm—Biebel, French & Nauman

[57] ABSTRACT

An energy efficient scale using a load cell for weight detection and a power supply for powering the load cell at one or another of three different current levels. The highest current level provides accurate weight indication. The intermediate current level provides only a signal indicating the presence of a package on the scale. The lowest current level is sufficient only for keeping the load cell electrically centered. If a package is placed on the scale while the load cell is receiving current at the intermediate level, then a resulting package detection signal causes the scale to switch to full operating current.

9 Claims, 4 Drawing Sheets

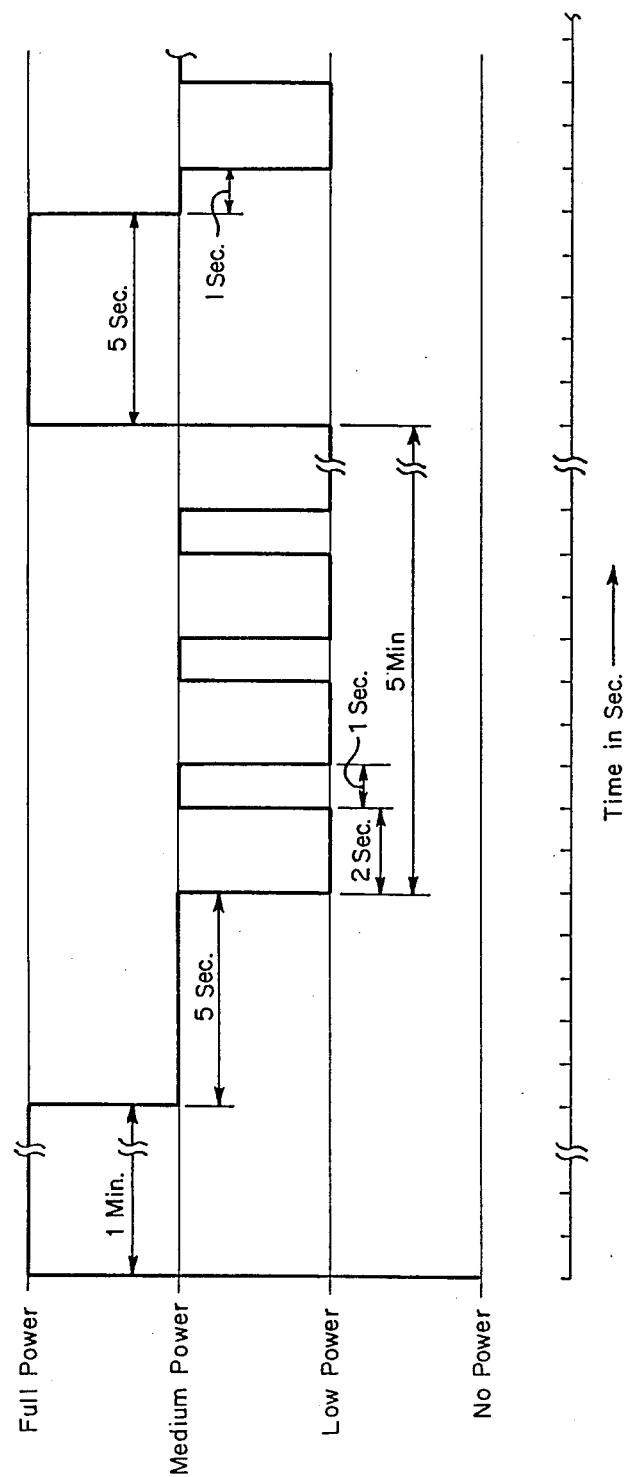

ENERGY EFFICIENT SCALE

BACKGROUND OF THE INVENTION

This invention relates to load cell scales and more particularly to load cell scales which are battery powered. Such scales are portable and are able to operate in remote areas where alternating current is not readily available. A principal problem with such scales is the fact that the batteries run down rather rapidly and have to be recharged or replaced.

A typical 350 ohm load cell scale requires at least about 25 milliamperes of current for operation at the accuracy typically required by governmental weights and measures officials for use in sales applications. At such a current drain prior art battery operated scales have typically required battery recharging or replacement after only about 10 hours of use. This life has been extended, however, by supplemental use of photo-voltaic cells. Longer battery life has also been obtained by adding resistance (either resistors or higher impedance load cells) to reduce the current drain. This latter technique causes a sacrifice in weighing accuracy.

SUMMARY OF THE INVENTION

This invention provides high accuracy operation of a load cell scale at a low enough average current drain for long-term operation from a modestly sized battery power pack. Such energy efficiency is obtained by powering the load cell during waiting periods from a supply which is too low for normal load cell operation but which is high enough for detection of the presence of an object on the scale. When an object is detected the load cell generates a load detection signal which is relayed to a microprocessor. The microprocessor then causes a switching operation which applies a normal operating current flow to the load cell. Thus the load cell in effect senses the presence of a load and controls its own current supply.

Thus one aspect of the invention contemplates a load cell scale comprising a load cell, a load responsive current supply means, a control means connected for switching control of the current supply means and an indicating means for creating an indication of the weight represented by the output signal from the load cell. The current supply means is switchable between a first state in which it supplies a normal operating current to the load cell and a second state in which it supplies to the load cell an energy saving current, lower than the operating current but high enough for enabling the load cell to detect the presence of an object and generate a load detection signal.

In another aspect the invention provides a method of operating a load cell scale wherein the load cell is powered during waiting periods by an energy saving current lower than normal operating current but high enough for detecting the presence of an object on the scale.

In a preferred embodiment the scale of the present invention has a pair of transistor switches at one side of the load cell and another pair of transistor switches at the other side of the load cell. The current supply means are split between the two sides, so that the transistor switches provide the load cell with current at three different non zero levels. The first level is a normal operating level at which the load cell operates at full weight reading accuracy. At the second level the load cell operates at reduced accuracy and is used only for detecting the presence of an object to be weighed. At the third level the load cell receives only enough current to keep it electrically centered and ready to operate. A programmed microprocessor causes the transistor switches to switch periodically from the third level to the second level. If a weight is placed on the scale during a period of time when the load cell is being powered at the third level, there is a slight delay in the weighing thereof. As soon as the second current level is applied to the load cell, the object is detected, and the circuit switches to the first level for generation of a weight indicating signal.

It is therefore an object of the present invention to provide a load cell scale which weighs an object at high accuracy while conserving power during periods when objects are not being weighed.

It is another object of the invention to provide a battery operated load cell scale which has a long battery life and yet meets governmental specifications for sales related use.

Other objects and advantages of the invention will be apparent from the following description, the accompanying drawings and the appended claims.

BRIEF DESCRIPTION OF THE DRAWINGS

FIG. 2 is a timing diagram illustrating the timing of power levels applied to a load cell.

DESCRIPTION OF THE PREFERRED EMBODIMENT

Figure 1:
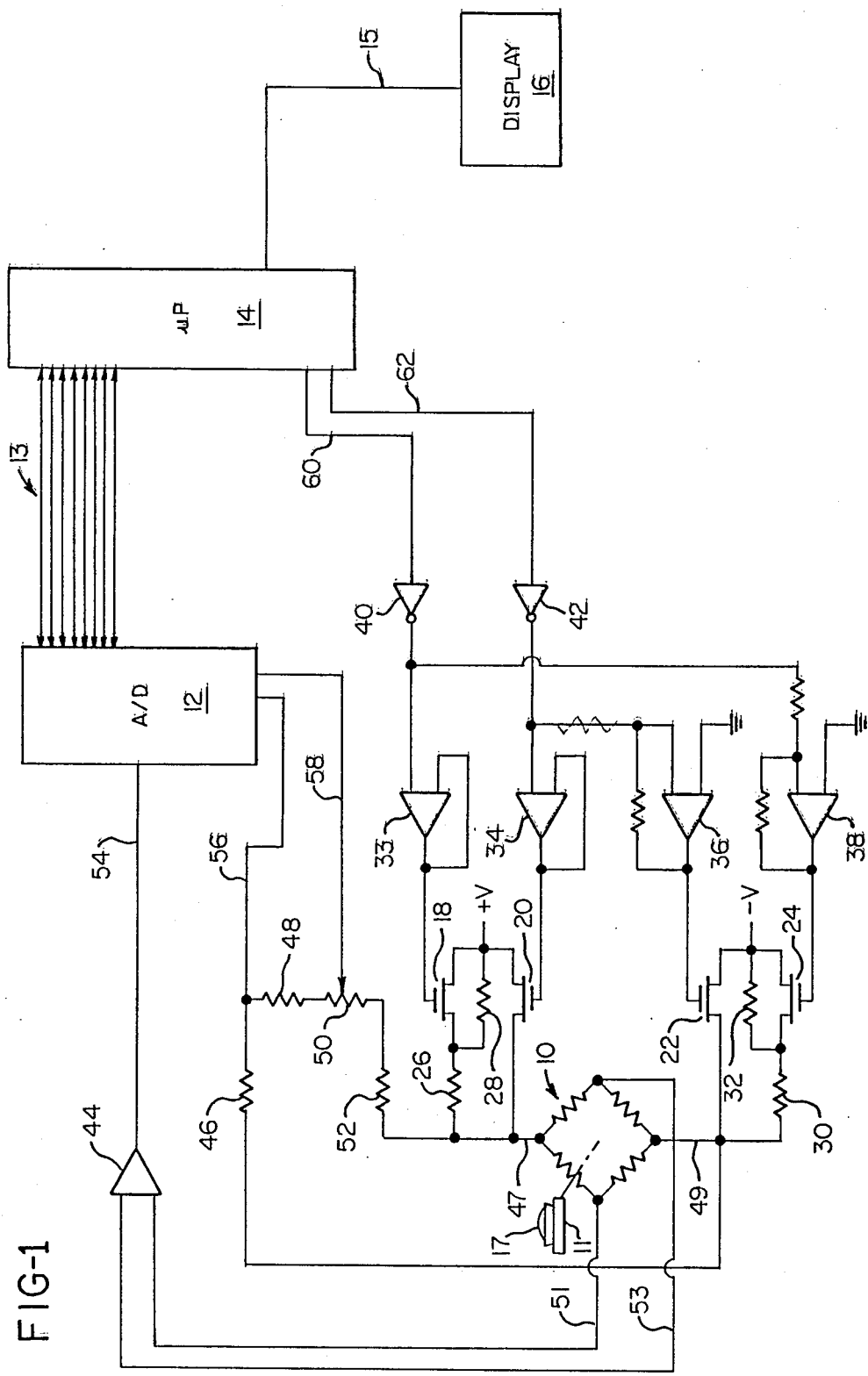
FIG. 1 is a schematic diagram of switching control apparatus for an energy efficient load cell scale.

As illustrated in FIG. 1, a scale constructed in accordance with the present invention may comprise a load cell 10 characterized by strain guages connected together in a bridge arrangement. Load cell 10 preferrably may be a device commercially known as a 350 ohm load cell, but other resistance values are suitable. The load cell is powered by current flowing through control lines 47, 48 and produces output signals on lines 51, 53 representing the weight of an object placed upon a platter supported by load cell 10. Output signals on lines 51, 53 are applied to an instrumentation amplifier 44 for comparison. The output signal from instrumentation amplifier 44 represents the weight of the object in analogue form. This signal is applied to A/D converter 12 via line 54. A/D converter 12 converts the weight signal to digital form for application to microprocessor 14 via data lines 13. Microprocessor 14 formats the weight signal for application to display 16 via line 15. Display 16 may be a visual display, a label printer, or any other convenient device for presenting an indication of object weight.

A/D converter 12 operates in the ratiometric mode, so that variations in supply voltage are not interpreted as weight variations. Thus resistors 46, 48, 50, 52 function as a voltage divider to provide a reference voltage across lines 56, 58 for A/D converter 12. The resistor network 46, 48, 50, 52 is driven by the load cell supply appearing on lines 47, 49.

The drive current for load cell 10 is controlled by four FET switches 18, 20, 22, 24. Switches 18, 20 are P-channel devices, whereas switches 22, 24 are N-channel devices. FET switches 18, 22 are arranged for parallel operation under control of the signals supplied by microprocessor 14 to output line 16 and inverted by amplifier 40. Switching control signals for FET 18 are amplified by voltage follower 33, whereas switching control signals for FET 24 are amplified by amplifier 38. FET switches 20, 22 operate in parallel under switching control of signals supplied by microprocessor 14 to line 62 and inverted by amplifier 42. FET 20 is serviced by voltage follower 34, whereas FET 22 is serviced by amplifier 36.

FET switches 18, 20, 22, 24 selectively cause current to flow through load cell 10 at any of three different levels. When switches 20, 22 are closed, load cell 10 is connected directly across the positive and negative terminals of the power supply, which comprise eight D-cell alkaline batteries. At this current level load cell 10 is fully operational and provides weight signals at an accuracy of 1 part in 30,000, which equates to ±0.01 lb. on a 30 lb. scale. At this point the system is in a operational condition hereinafter referred to as Mode I. In the mode all components of the scale are fully energized, and about 38 milliamperes of current are drawn from the power supply.

During periods of time when there is no load on the scale the system switches into Mode II, a low power mode in which load cell 10 receives about 40% of full power. Display 16 and other peripheral (not illustrated) are deenergized at this time. The current drain during Mode II is about 20 milliamperes. During this mode FET switches 20, 22 are switched OFF and FET switches 18, 24 are switched ON. In this mode load cell 10 is connected to the power supply through resisters 26, 30 and does not receive sufficient current for full reading accuracy. However, the current supply is sufficient to enable generation of output weight indications which are accurate within about 0.01 lbs. These weight indications serve as load detection signals. When such load detection signals are sensed during Mode II operation, the microprocessor switches the system to Mode I operation. The involves closing FET switches 20, 22 and opening FET switches 18, 24.

The system also has a low power mode, termed Mode III, in which all of FET switches 18, 20, 22, 24 are opened. During this mode load cell 10 is connected to the power supply via resisters 26, 28, 30, 32, and the system as a whole draws only about 7 milliamperes of current. The current flow through load cell 10 is insufficient for generation even of load detection signals, but the load cell is kept electrically centered. Microprocessor 14 cycles FET switches 18, 24 ON and OFF cyclically to produce the power utilization plot of FIG. 2. It will be appreciated that a load detection signal may not be generated and an object may not be weighed when the system is in Mode III. If an object is placed on the platter when the system is in Mode III, the system takes no immediate responsive action. However, as soon as the system makes it next periodic switch to Mode II, the object is detected, and an automatic switch to Mode I is made.

From an energy savings point of view it is desirable to keep the duration of Mode III settings as long as possible. However, this slows down the weighing operation. Thus as illustrated in FIG. 2 the invention and preferred embodiment compromises by fixing the Mode III periods at two seconds. This means that the system (when energized) will always respond to a load in two seconds or less.

Referring now to FIG. 2, it will be seen that the system goes immediately to full power (Mode I) upon energization and maintains that condition for one minute. Following a one minute warm-up the system is zeroed, and then a transition is made to medium power (Mode II). Medium power is maintained for five seconds and then the system begins periodically switching between low power (Mode III) and medium power. Following each two second period in low power, the system switches to medium power for one second and thereafter transitions again to low power. Cyclical switching between low power and medium power proceeds for a five minute period, after which the system switches to full power for five seconds in order to check high power scale zero. The five minute cycle then repeats. Each time the system switches to full power the scale is again zeroed. As noted above, cyclical switching from medium power back to low power is interrupted whenever an object is detected on the platter. This operating technique provides about 1,000 hours of life from a battery pack consisting of eight D-cell alkaline batteries.

Figure 3A:
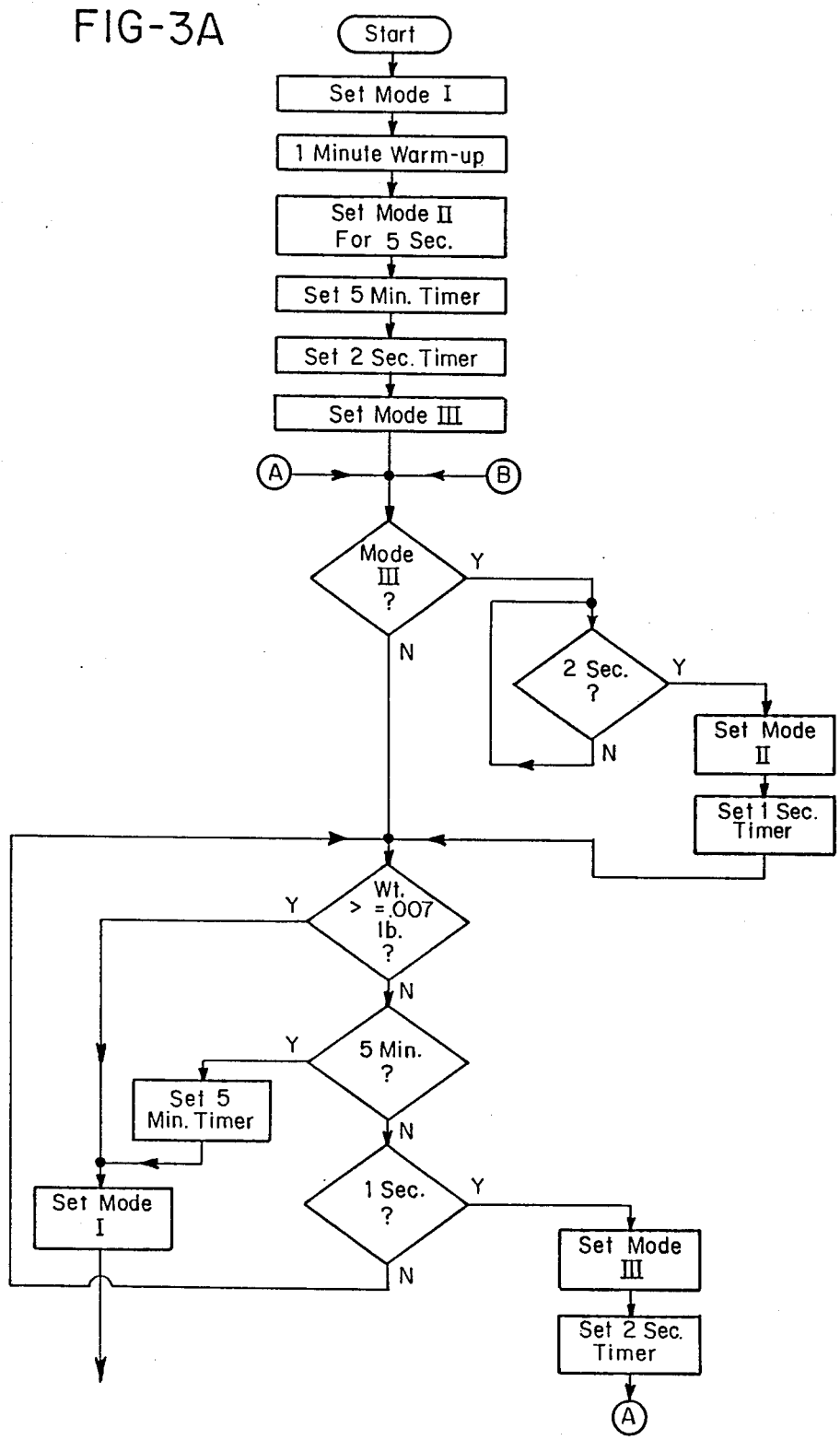
FIGS. 3A and 3B are a flow chart illustrating the logical sequence followed by the apparatus of FIG. 1.
Figure 3B:
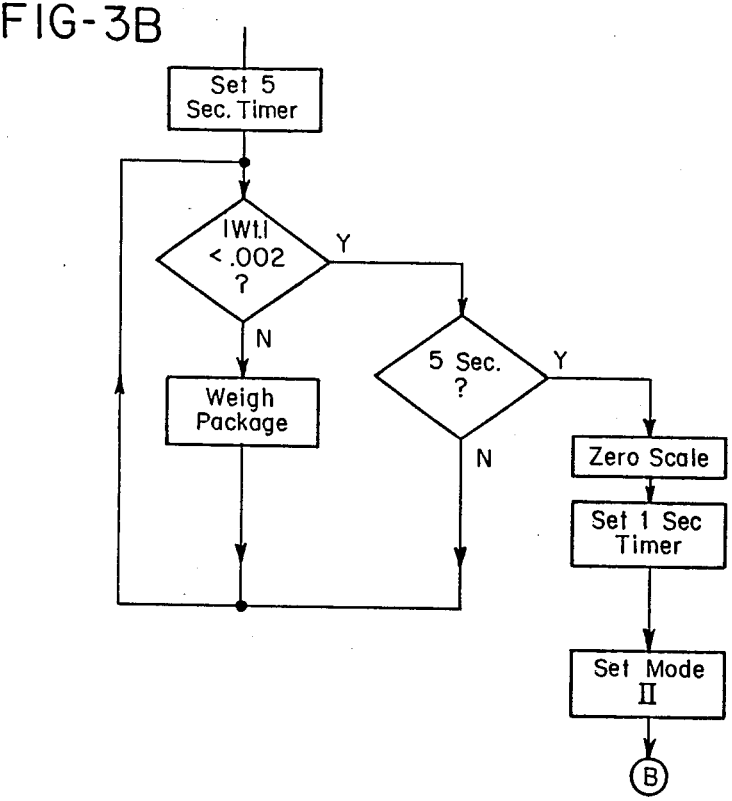

FIG. 3 illustrates the logic which is programmed into microprocessor 14. As shown therein the microprocessor begins by setting Mode I, and then going through a one minute warm-up. Mode II is then entered for five seconds, after which the system sets counters which will produce a five minute time out and a two second time out. Thereafter the system enters Mode III and begins a logical process causing continuance in Mode III for two seconds followed by one second in Mode II. While the system is in Mode II it checks to see if the weight reading is greater than 0.007 lbs. If so, then a transition is made to Mode I. Otherwise the system stays in Mode II and continues weight testing for a one second period. After each weight check the five minute timer is checked. If a five minute period has elapsed, the timer is reset and the system enters Mode I.

Immediately upon entry into Mode I the system sets a five second timer and then begins checking to determine whether there is no weight on the platter (absolute value of a weight less than 0.002 lbs.). If the load cell senses a weight greater than 0.002 lbs. then a weighing routine is entered. Such weighing routines are well-known in the art and need not be further described here. If there is no weight on the scale then the system continues checking for a maximum of five seconds, zeros the scale, sets the one second timer, sets Mode II and branches back to the Mode III checkpoint.

It will be appreciated that it is not essential for FET switches 18, 24 to be opened when FET switches 20, 22 are closed. Furthermore it is possible to obtain substantial although reduced energy efficiency by operating only in the medium power and high power modes.

While the methods herein described, in the forms of apparatus for carrying these methods into effect, constitute preferred embodiments of this invention, it is to be understood that the invention is not limited to these precise methods in forms of apparatus, and that changes may be made in either without departing from the scope of the invention, which is defined in the appended claims.

What is claimed is:

1. A load cell scale comprising:
   a load cell for sensing the weight of an object supported thereby and generating a weight indicating signal corresponding thereto,
   current supply means for supplying electrical current to said load cell, said current supply means being switchable between a first state in which it supplies a normal operating current to said load cell and a second state in which it supplies to said load cell an energy saving current, lower than said operating current but high enough for enabling said load cell to detect the presence of said object and generate a load detection signal, control means connected to said current supply means to control the switching thereof between said first and second states, said control means being operative in the absence of said object to cause said current supply means to switch to said second state and responsive to said load detection signal to cause said current supply means to switch to said first state, and indicating means for creating an indication of the weight represented by said weight indicating signal.

2. A load cell scale comprising:

a load cell for sensing the weight of an object supported thereby and generating a weight indicating signal corresponding thereto, first current supply means for supplying electrical current to said load cell in an amount enabling operation of said load cell at its full normal resolution second current supply means for supplying electrical current to said load cell in an amount sufficiently low for conserving electrical energy but high enough for enabling said load cell to detect the presence of said object and generate a load detection signal, switch means for selectively connecting said first current supply means and said second current supply means to said load cell, control means operative in the absence of said object for causing said switch means to disconnect said first current supply means from said load cell and connect said second current supply means thereto, said control means being responsive to said load detection signal by causing said switch means to reconnect said first current supply means to said load cell, and indicating means for creating an indication of the weight represented by said weight indicating signal.

3. A load cell scale according to claim 2 wherein said control means causes alternate connection of said first and second current supply means to said load cell.

4. A load cell scale according to claim 2 wherein said control means are operative in the absence of said object for causing periodic disconnection and reconnection of said second current supply means from and to said load cell.

5. A load cell scale according to claim 4 further comprising third current supply means for supplying electrical current to said load cell in an amount less than provided by said second current supply means but sufficiently high to maintain said load cell in an electrically centered condition; said control means being operative in the absence of a weight on said load cell for causing periodic switching of said load cell between said second current supply means and said third current supply means.

6. A load cell scale according to claim 2 wherein said first and second current supply means are split across said load cell; said switch means comprising a pair of transistor switches at each side of said load cell.

7. Method of operating a load cell scale comprising the steps of:

supplying electrical current to a load cell in an energy saving amount which is insufficient for normal weighing operation but sufficient for detecting the presence of an object on said scale, sensing the presence of said object on said scale, applying a normal operating current to said load cell in response to sensing the presence of said object, and causing the generation of a weight indicating signal therefrom, and using said weight indicating signal to create an indication of the weight represented thereby.

8. Method according to claim 7 comprising the step of periodically and cyclically reducing said energy saving electrical current to a still lower level sufficient for keeping said load cell electrically centered but insufficient for detecting the presence of a package on said scale.

9. Method according to claim 8 comprising the steps of periodically and cyclically applying said normal operating current to said load cell, and zeroing said scale during said current application.

* * * * *